Patented Jan. 25, 1944

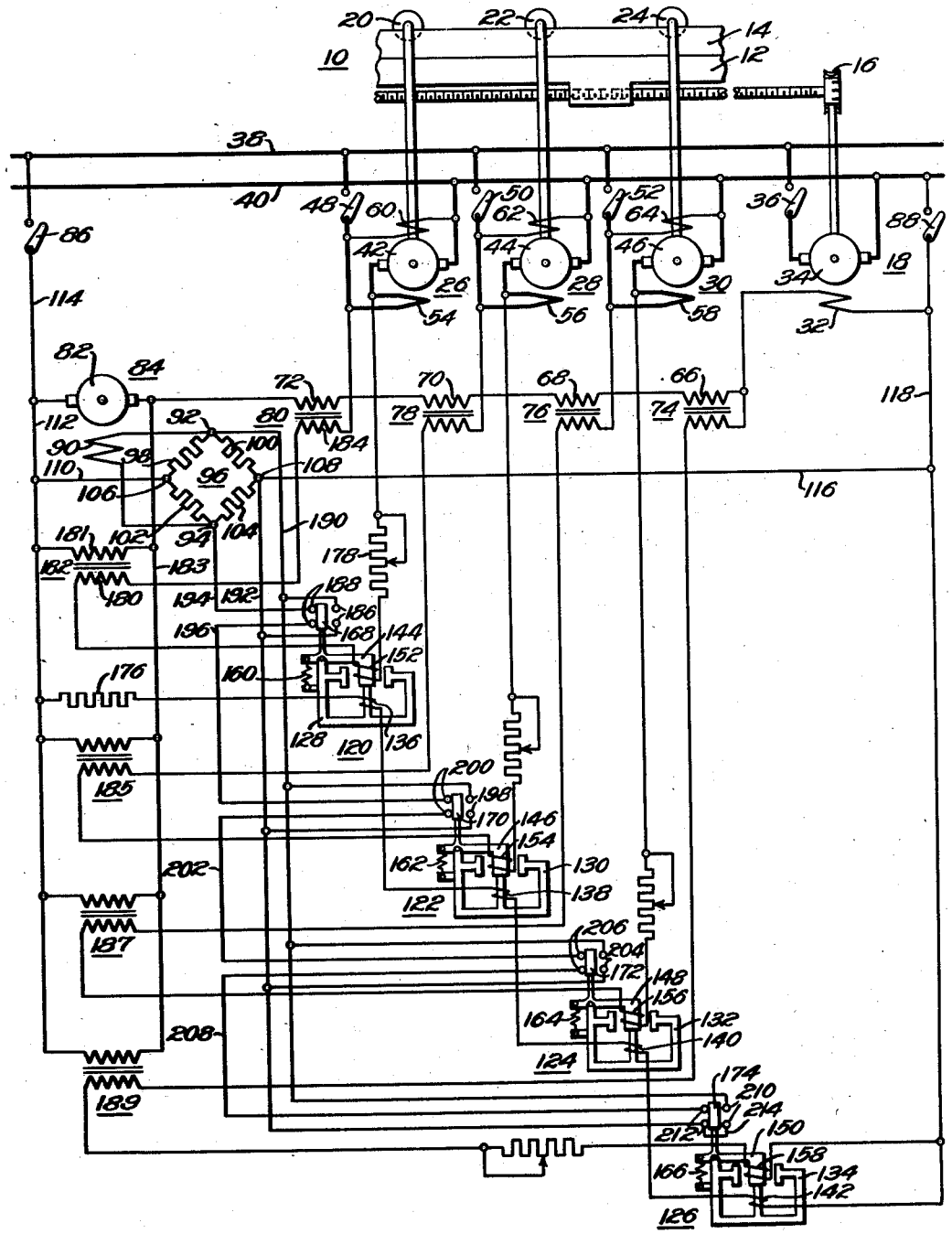

2,340,060

UNITED STATES PATENT OFFICE 2,340,060

REGULATING SYSTEM

George E. King and Ralph A. Geiselman, Wilkinsburg, Pa., assignors to Westinghouse Electric & Manufacturing Company, East Pittsburgh, Pa., a corporation of Pennsylvania Application January 8, 1943, Serial No. 471,662

7 Claims. (Cl. 90—21)

This invention relates generally to regulating systems and, in particular, to regulating systems for milling machines or the like.

In industry, many planing, cutting and milling machines are used for dressing different types of work. The work is usually carried on a movable work table which is operated by a feed motor with the cutting or milling tool operated by a motor at a certain speed depending upon the speed of the feed motor and the type of work. In such cases, the cutting motor is usually operated at full load, the feed motor being operated to feed the work to the cutter at a rate sufficient to maintain the full load on the cutter.

It is a relatively simple matter to provide a regulating system for such milling machines which utilize one cutting tool but where a plurality of cutting tools are to be operated, thus necessitating a plurality of cutting motors, it becomes quite difficult to provide a satisfactory regulating system for controlling the speed of the feed motor in response to variations in the load of any one or all of the different cutter motors.

It is an object of this invention to provide, in a machine tool having a feed motor and a plurality of cutter motors, for controlling the speed of the feed motor in response to the loads on the different cutter motors.

Another object of this invention is to provide, in a machine tool having a feed motor and a plurality of cutter motors, for decreasing the speed of the feed motor in response to an overload on any one of the motors.

A further object of this invention is to provide, in a machine tool having a feed motor and a plurality of cutter motors, for decreasing the speed of the feed motor in response to an overload on any one of the motors and to increase the speed of the feed motor only in response to a predetermined operation of all of the motors.

Other objects of this invention will become apparent from the following description when taken in conjunction with the accompanying drawing, the single figure of which is a diagrammatic view of the apparatus and circuits embodying the teachings of this invention.

Referring to the drawing, this invention is illustrated as applied to a machine tool 10, fragmentarily shown as comprising a work table 12 carrying work 14, disposed to be driven through a worm and gear drive 16 by a feed motor 18. A plurality of cutters 20, 22 and 24 are illustrated as disposed to be operated by cutter motors 26, 28 and 30, respectively, to perform predetermined operations on the work 14.

The feed motor 18 comprises a separately excited field winding 32 and an armature winding 34 disposed to be connected by the switch 36 to a constant source of power represented by supply conductors 38 and 40. The field winding 32 of the feed motor 18 is connected in series with the primary windings 66, 68, 70 and 72 of damping transformers 74, 76, 78 and 80, respectively, the purpose of which will be explained more fully hereinafter and the armature winding 82 of an exciter 84, such series connected elements being disposed to be connected to supply conductors 38 and 40 by switches 86 and 88, respectively.

Each of the cutter motors 26, 28 and 30 has an armature winding 42, 44 and 46, respectively, disposed to be connected by a switch 48, 50 and 52, respectively, to supply conductors 38 and 40, the motors each having a commutating field winding 54, 56, and 58, respectively, connected in series with the armature winding of the respective motors. A shunt field winding 60, 62 and 64 is also provided for each of the cutter motors 26, 28 and 30, respectively.

The exciter 84 is provided with a field winding 90 which is connected across terminals 92 and 94 of a resistance bridge 96 formed by the resistor legs 98—100 and 102—104 connected between terminals 106 and 108. The terminal 106 of the resistance bridge 96 is connected by conductors 110 and 112 to the conductor 114 and the switch 86 while the terminal 108 is connected by conductor 116 to conductor 118 and the switch 88, whereby the bridge 96 is disposed to be connected across supply conductors 38 and 40.

As illustrated, each of the cutter motors 26, 28 and 30 and the feed motor 18 is provided with a regulating relay 120, 122, 124 and 126, respectively. Each of the relays 120, 122, 124 and 126 is of the same general type disclosed in Patent 1,820,712, issued August 25, 1931, to W. Schaelchlin, and assigned to the assignee of this invention, and comprises a magnetic core member 128, 130, 132 and 134, respectively, having a main energizing winding 136, 138, 140 and 142, respectively, disposed thereon, a pivotally mounted armature member 144, 146, 148, and 150, respectively, having an auxiliary energizing winding 152, 154, 156, and 158, respectively, disposed thereon in a predetermined manner. A spring member 160, 162, 164 and 166 is provided for each of the relays 120, 122, 124 and 126, respectively, disposed to bias the armature member of the respective relays against the magnetic pull of the energizing winding, a contact member 168, 170, 172 and 174, respectively, being carried by the armature member and disposed for movement therewith. As illustrated, the main energizing windings 136, 138, 140 and 142 of the relays 120, 122, 124 and 126, respectively, are connected in series circuit relation with each other and with a resistor 176 across conductors 112 and 118 and are maintained at a constant energization when the switches 86 and 88 are in their circuit closing position to connect the conductors 112 and 118 to supply conductors 38 and 40.

As illustrated, the auxiliary energizing winding 152 of relay 120 is disposed with its one end connected through an adjustable rheostat 178 to one terminal of the commutating winding 54 of the associated cutter motor 26, the other end of the winding 152 being connected through the secondary winding 180 of a damping transformer 182 and the secondary winding 184 of the damping transformer 80 to the other end of the commutating winding 54. The primary winding 181 of the damping transformer 182 is connected by conductors 112 and 183 across the armature 82 of the exciter 84 so that the change in voltage across the winding 181 is a measure of the change across the armature 82.

The auxiliary energizing windings 154 and 156 of the relays 122 and 124 respectively, are likewise connected across the commutating windings 56 and 58, respectively, of the associated cutter motors 28 and 30 through series connected secondary windings of damping transformers 185—78 and 187—76 respectively, in a manner similar to the connection of the auxiliary energizing winding 152 of relay 120.

Likewise the auxiliary energizing winding 158 of the relay 126 is disposed to have its one end connected by conductor 118 to one terminal of the field winding 32 of the feed motor 18, the other end of the winding 158 being connected through an adjustable resistor and the series connected secondary windings of damping transformers 189—74 to the other end of the field winding 32 in the same manner as the connection of the auxiliary windings of relays 120, 122 and 124 across the commutating field winding of their associated cutter motors. As illustrated the primary windings of each of damping transformers 185, 187 and 189 are connected in parallel with the primary winding of transformer 182 across the armature winding 82 of the exciter 84.

The movable contact member of each of the relays 120, 122, 124, and 126 is disposed for movement between opposed contact members for controlling the direction of current flow through the field winding 90 of the exciter 84. As illustrated, the contact member 168 of relay 120 is disposed for movement between contact members 186 and 188, one of the contact members 186 being connected to a conductor 190 which is connected to the terminal 92 of the resistance bridge 96, the other contact member 186 being connected by a conductor 192 to the terminal 108 of the resistance bridge 96. One of the contact members 188 is connected by a conductor 194 to the terminal 94 of the bridge 96, the other contact member 188 being connected to a conductor 196.

Similarly, the movable contact member 170 of relay 122 is disposed for movement between contact members 198 and 200, one of the contact members 198 also being connected to the conductor 190, the other contact member 198 being connected to the conductor 192. One of the contact members 200 is connected to conductor 196, the other contact member 200 being connected to a conductor 202.

The relay 124 is also provided with contact members 204 and 206 for cooperating with the movable contact member 172, one of the contact members 204 being connected to conductor 190, the other contact member 204 being connected to conductor 192. As illustrated, one of the contact members 206 is connected to conductor 202 while the other contact member 206 is connected to conductor 208.

The feed motor relay 126 has its movable contact member 174 disposed for operation between contact members 210 and 212, one of the contact members 210 being connected to conductor 190 and the other contact member 210 being connected through a conductor 214 to one of the contact members 212 which is connected to conductor 192. The other contact member 212 is connected to conductor 208.

Thus when all of the contact members 168, 170, 172 and 174 are actuated in a counterclockwise direction into engagement with their left-hand contact members, a series circuit is completed to shunt the leg 104 of resistance bridge 96 and connect the field winding 90 of the exciter 84 in such a manner as to buck the normal flow of current through the field winding 32 of the feed motor 18 and effect an increase in the speed of the feed motor 18. On the other hand, if any one of the contact members 168, 170, 172 and 174 is actuated in a clockwise direction to bridge its associated right-hand contact members, then a circuit is completed from the terminal 108 of the bridge 96 through conductor 192 and the closed right-hand contact members of any one of the relays and conductor 190 to the terminal 92 to shunt the leg 100 of the bridge 96 and thereby so connect the field winding 90 of the exciter 84 that the output of the exciter 84 will boost the normal flow of current through the field winding 32 of the feed motor 18 and thereby effect a decrease in the speed of the feed motor.

In operation, assuming that the switches 48, 50, 52, 86 and 88 are actuated to their circuit closing position and that the feed motor 18 and the cutter motors 26, 28 and 30 are energized with the adjustable resistor associated with each of the relays 120, 122, 124 and 126 so adjusted that the magnetic pull of the main energizing widings of each of the relays balances the mechanical pull of the spring member associated with the armature member of the relays, the cutter motors and feed motor will operate at the maximum speed for maximum loading of the cutter motors. For this normal operation of the feed motor and the cutter motors and with the energization of the main windings 136, 138, 140 and 142 of the relays 120, 122, 124 and 126, respectively, at a constant value, it is apparent that the movable contact members of the respective relays are vibrating into and out of engagement with their associated left-hand contact members.

If for any reason, any one of the cutter motors, for example, cutter motor 26, is overloaded, then the current in the commutating field winding 54 of motor 26 is increased with the result that the auxiliary field winding 152 of relay 120 is so energized as to actuate the contact member 168 to bridge the contact members 186. The bridging of contact members 186 closes a circuit which extends from the terminal 108 of bridge 96 through conductor 192, contact members 186 and conductor 190 to the terminal 92 to shunt the leg 100, whereby current flows through the field winding 90 of the exciter 84 in a direction to increase the flow of current through the field winding 32 of the feed motor 18 to effect a decrease in the speed of the feed motor 18 and, in effect, remove the overload condition from the cutter motor 26. As the flow of current through the field winding 32 of feed motor 18 increases, it is to be noted that the current flow through the primary windings 72 of the damping transformer 80 and the primary winding of damping transformer 182 which is connected across the armature 82 of the exciter 84 is increased to induce a flow of current in the auxiliary winding circuit of the relay 120 which is in opposition to the normal flow of current occasioned by the drop across the commutating winding 54 of the cutter motor 26. The effect of such a decrease in the energization of the auxiliary winding 152 of relay 120 is immediate and in anticipation of the change in the load conditions on the cutter motor 26. Such a decrease in the energization of the winding 152 permits the spring 160 to actuate the contact member 168 away from the contact members 186 to interrupt the shunting circuit around the leg 100 of the bridge 96, and, in effect, deenergize the field winding 90 of the exciter 84 to prevent the overenergization of the field winding 32 of the feed motor and thereby prevent decreasing the speed of the feed motor below the point necessary for removing the overload on the cutter motor 26. As will be appreciated the movement of the contact member 168 into and out of engagement with contact members 186 is a fast vibrating movement as the overload condition is removed, the damping transformers 182 and 80 providing satisfactory anti-hunt control.

A similar operation for any one of the cutter motors 28 and 30 and for the feed motor 18 is obtained where any one of these motors is overloaded, the associated relay 122, 124, and 126, respectively, being disposed to connect the field winding 90 of the exciter 84 in the manner described hereinbefore with respect to the operation of the cutter motor 26 to increase the excitation of the field winding 32 of the feed motor 18 and effectively decrease the speed of the feed motor to thereby remove the overload condition. Similarly, the damping transformers connected in series with the auxiliary energizing winding of each of the relays 122, 124 and 126 functions to anticipate the corrective action and to prevent overcorrection in the operation of the feed motor 18.

On the other hand, if the load of cutter motor 26 is decreased, then the auxiliary winding 152 of the associated relay 120 is deenergized to permit the movable contact members 168 to engage the contact members 188. The operation of the contact member 168 to bridge the contact members 188 fails to produce any corrective operation of exciter 84 as long as any one of the contact members 170, 172 and 174 of the relays 122, 124 and 126, respectively, is in a position other than that of bridging its associated left-hand contacts members. However, if the auxiliary windings 154, 156 and 158 of the relays 122, 124 and 126, respectively, are so deenergized that the movable contact members 170, 172 and 174 are in their left-hand position bridging contact members 200, 206, and 210, respectively, then the movement of the actuating member 168 of relay 120 to bridge the contact members 188 is effective for establishing a series circuit to shunt the leg 104 of bridge 96. This shunting circuit may be traced from the terminal 94 of the resistance bridge 96 through conductor 194, contact members 188 and 168, conductor 196, contact members 200 and 170, conductor 202, contact members 206 and 172, conductor 208, contact members 212 and 174 and conductor 192 to the terminal 108 of the bridge 96. The shunting of the leg 104 so connects the field winding 90 of the exciter 84 that the output of the exciter 84 is in opposition to the normal flow of current through the field winding 32 of the feed motor 18 to effect a decrease in the energization of the field winding 32 and thereby effect an increase in the speed of the feed motor 18.

Again, the damping transformers associated with each of the relays 120, 122, 124 and 126 function to anticipate the corrective action to prevent increasing the speed of the feed motor to such a degree as to overload any one of the cutter motors. As will be apparent, the flow of current in the auxiliary energizing winding circuit of the relay 120 in opposition to the normal flow of current will be greatly reduced by the decrease in the current supplied to the field winding of the feed motor whereby, in effect, the energization of the energizing winding 152 is increased to effect the movement of the movable contact member 168 away from the contact members 188 to interrupt the shunting circuit about the leg 104 of the resistance 96. Similarly, any one of the relays 120, 122, 124 and 126 will respond to a change in current in their associated damping transformers to operate their movable contact members away from their left-hand contact members to interrupt the shunting circuit about the leg 104.

It is apparent from the foregoing description that an overload on any one of the motors will effect a corrective operation of the feed motor 18 to remove the overload condition whereas it is necessary for all of the relays 120, 122, 124 and 126 to be operated in a predetermined manner to effect an increase in the speed of the feed motor 18. By providing the system described hereinbefore, it is also seen that the feed motor speed is limited to approximately the speed required for the maximum loading on the cutter motors thereby permitting the speed of the feed motor to be at a high value without forcing the work into the cutter so fast as to damage the cutting tools or to seriously overload the cutter motors. This latter operation is obtained primarily because of the relay associated with the feed motor, such relay in effect measuring the voltage drop across the field winding of the feed motor. Since the armature voltage of the motor is substantially constant and the friction load is actually 100% of the load of the feed motor, the drop across the field of the feed motor gives a relatively accurate measure of the speed of the motor. It is, therefore, apparent that the relay 126 is utilized for permitting any of the individual cutter motors to speed up the feed motor to a point where the speed has reached a maximum.

Although this invention has been described with reference to a particular improvement thereof, it is, of course, not to be limited thereto except insofar as is necessitated by the scope of the appended claims.

We claim as our invention:

1. In combination with a machine tool having a work table and a plurality of cutters, a feed motor having a field winding disposed to drive the work table, a motor for driving each of the cutters, each of the cutter motors having an armature winding and a field winding, an exciter having an armature winding connected in series circuit relation with the field winding of the feed motor, a field winding for the exciter disposed to be connected to control the energization of the feed motor, and a plurality of relays for controlling the connection of the field winding of the exciter to control the speed of the feed motor, one of the relays being responsive to the field winding of the feed motor and each of the other relays being responsive to the armature current of an associated cutter motor.

2. In combination with a machine tool having a work table and a plurality of cutters, a feed motor having a field winding disposed to drive the work table, a motor for driving each of the cutters, each of the cutter motors having an armature winding and field winding, an exciter having an armature winding connected in series circuit relation with the field winding of the feed motor, a field winding for the exciter disposed to be connected to control the energization of the feed motor, a relay responsive to the field winding of the feed motor, and a relay associated with and responsive to the armature current of each of the cutter motors, each of the relays having a circuit closing member disposed to be actuated in the one or the other direction, each of the circuit closing members being disposed when actuated in the one direction to connect the field winding of the exciter to effect an increase in the energization of the field winding of the feed motor, the circuit closing members also being disposed to connect the field winding of the exciter to effect a decrease in the energization of the field winding of the feed motor when only all of the circuit closing members are actuated in the other direction.

3. In combination with a machine tool having a work table and a plurality of cutters, a feed motor having a field winding disposed to drive the work table, a motor for driving each of the cutters, each of the cutter motors having an armature winding and a field winding, an exciter having an armature winding connected in series circuit relation with the field winding of the feed motor, a field winding for the exciter disposed to be connected to control the energization of the feed motor, means responsive to the feed motor and cutter motors for controlling the connection of the field winding of the exciter to control the speed of the feed motor, and means comprising damping transformers connected in circuit relation with the feed motor and the exciter for affecting the controlling means in anticipation of a correction of the speed of the feed motor.

4. In combination with a machine tool having a work table and a plurality of cutters, a feed motor having a field winding disposed to drive the work table, a motor for driving each of the cutters, each of the cutter motors having an armature winding and a field winding, an exciter having an armature winding connected in series circuit relation with the field winding of the feed motor, a field winding for the exciter disposed to be connected to control the energization of the feed motor, means comprising damping transformers connected in circuit relation with the feed motor and exciter and each of the relays for affecting the operation of the relay connected in circuit therewith in anticipation of a correction of the speed of the feed motor, and a plurality of relays for controlling the connection of the field winding of the exciter to control the speed of the feed motor, one of the relays being responsive to the field winding of the feed motor and each of the other relays being responsive to the armature current of an associated cutter motor.

5. In combination with a machine tool having a work table and a plurality of cutters, a feed motor having a field winding disposed to drive the work table, a motor for driving each of the cutters, each of the cutter motors having a commutating field winding, an exciter having an armature winding connected in series circuit relation with the field winding of the feed motor, a field winding for the exciter disposed to be connected to control the energization of the field motor, a relay responsive to the field winding of the feed motor, a relay associated with and responsive to the commutating field winding of each of the cutter motors, each of the relays having a circuit closing member disposed to be actuated in the one or the other direction, each of the circuit closing members being disposed when actuated in the one direction to connect the field winding of the exciter to effect an increase in the energization of the field winding of the feed motor, the circuit closing members also being disposed to connect the field winding of the exciter to effect a decrease in the energization of the field winding of the feed motor when only all of the circuit closing members are actuated in the other direction, and means comprising damping transformers connected in circuit relation with the feed motor and exciter and each of the relays for affecting the operation of the relay connected in circuit therewith in anticipation of a correction of the speed of the feed motor.

6. In combination with a machine tool having a work table and a plurality of cutters, a feed motor having a field winding disposed to drive the work table, a motor for driving each of the cutters, each of the cutter motors having a commutating field winding, an exciter having an armature winding connected in series circuit relation with the field winding of the feed motor, a field winding for the exciter disposed to be connected to control the energization of the feed motor, a relay having an energizing winding connected across the field winding of the feed motor, a relay having an energizing winding connected across the commutating field winding of each of the cutter motors, each of the relays having a circuit closing member disposed to be actuated in the one or the other direction for controlling the connection of the field winding of the exciter to control the speed of the feed motor, and means comprising damping transformers connected in circuit relation with the feed motor and exciter and the energizing winding of each of the relays for affecting the operation of the relay connected in circuit therewith in anticipation of a correction of the speed of the feed motor.

7. In combination with a machine tool having a work table and a plurality of cutters, a feed motor having a field winding disposed to drive the work table, a motor for driving each of the cutters, each of the cutter motors having a commutating field winding, an exciter having an armature winding connected in series circuit relation with the field winding of the feed motor, a field winding for the exciter disposed to be connected to control the energization of the feed motor, a relay having an energizing winding connected across the field winding of the feed motor, a relay having an energizing winding connected across the commutating field winding of each of the cutter motors, each of the relays having a circuit closing member disposed to be actuated in the one or the other direction, each of the circuit closing members being disposed when actuated in the one direction to connect the field winding of the exciter to effect an increase in the energization of the field winding of the feed motor, the circuit closing members also being disposed to connect the field winding of the exciter to effect a decrease in the energization of the field winding of the feed motor when only all of the circuit closing members are actuated in the other direction, and means comprising damping transformers connected in circuit relation with the feed motor and the exciter and the energizing winding of each of the relays for affecting the operation of the relay connected in circuit therewith in anticipation of a correction of the speed of the feed motor.

GEORGE E. KING.
RALPH A. GEISELMAN.